(12) United States Patent
De Vries (10) Patent No.: US 11,419,411 B2
(45) Date of Patent: Aug. 23, 2022

(54) ADJUSTABLE HEIGHT DESK

(71) Applicant: LIMBER OFFICE LIMITED, Wellington (NZ)

(72) Inventor: Bart Johan De Vries, Wellington (NZ)

(73) Assignee: LIMBER OFFICE LIMITED, Wellington (NZ)

(*) Notice: Subject to any disclaimer, the term of this patent is extended or adjusted under 35 U.S.C. 154(b) by 0 days.

(21) Appl. No.: 17/244,109

(22) Filed: Apr. 29, 2021

(65) Prior Publication Data

US 2021/0345769 A1 Nov. 11, 2021

Related U.S. Application Data

(60) Provisional application No. 63/022,141, filed on May 8, 2020.

(51) Int. Cl.
*A47B 9/14* (2006.01)
*A47B 21/02* (2006.01)

(52) U.S. Cl.
CPC ............... *A47B 9/14* (2013.01); *A47B 21/02* (2013.01)

(58) Field of Classification Search
CPC ... A47B 9/14; A47B 3/083; A47B 2200/0083; A47B 2200/0086
USPC .......... 108/180, 189, 165, 157.14; 248/188.2
See application file for complete search history.

(56) References Cited

U.S. PATENT DOCUMENTS

| | | | | |
|---|---|---|---|---|
| 1,710,123 A | * | 4/1929 | Toops | A47B 69/00 312/212 |
| 1,903,631 A | * | 4/1933 | Morrison | A47B 3/12 108/150 |
| 2,361,875 A | * | 10/1944 | Sachs | A47C 5/005 108/165 |
| 3,523,702 A | * | 8/1970 | Unti | A47B 9/14 403/107 |
| 3,724,399 A | * | 4/1973 | Notko | A47B 3/12 108/157.14 |
| 3,908,565 A | * | 9/1975 | Burnett | A47B 23/046 108/147 |
| 4,026,220 A | * | 5/1977 | Schuring, Jr. | A47F 5/04 108/101 |
| 4,078,502 A | * | 3/1978 | Barna | A47B 3/06 108/150 |
| 4,515,280 A | * | 5/1985 | Sheu | A47B 47/0033 108/180 |

(Continued)

*Primary Examiner* — Jose V Chen
(74) *Attorney, Agent, or Firm* — Newport IP, LLC; Leonard J. Hope (57) ABSTRACT

An adjustable height desk is disclosed herein that is configured for easy assembly and disassembly. The desk includes panels joined to form a support core for supporting a working surface. The desk also includes a planar base that is easily attached to and removed from the support core by way of protrusions on panels of the support core. The protrusions have locking holes formed therein. Through holes in the base receive the protrusions. Locking pins are inserted through the locking holes to form a compression fit. The locking pins can be sized for movement through a locking hole and for creating a compression fit when inserted into a locking hole. One end of the locking pins can be configured with a hook portion for mating with a locking pin insertion/removal tool. The tool can be utilized to insert and remove the locking pins.

4 Claims, 11 Drawing Sheets

(56) References Cited

U.S. PATENT DOCUMENTS

| | | | | |
|---|---|---|---|---|
| 5,868,371 | A * | 2/1999 | Nuzzo | A47F 5/116 |
| | | | | 248/346.01 |
| 6,135,032 | A * | 10/2000 | Ko | A47B 9/083 |
| | | | | 108/147.21 |
| 6,481,808 | B2 * | 11/2002 | Cinese | A47B 9/14 |
| | | | | 108/147.21 |
| RE38,707 | E * | 3/2005 | Merkel | A47B 47/042 |
| | | | | 108/180 |
| 6,997,117 | B1 * | 2/2006 | Mitjans | A47B 19/00 |
| | | | | 108/150 |
| 7,533,940 | B1 * | 5/2009 | Zook | A47B 83/02 |
| | | | | 297/440.13 |
| 8,079,315 | B2 * | 12/2011 | Berent | A47C 4/03 |
| | | | | 108/158.12 |
| 2013/0333595 | A1 * | 12/2013 | Cotey | A47B 13/023 |
| | | | | 108/42 |
| 2016/0135590 | A1 * | 5/2016 | Zaccai | A47B 13/023 |
| | | | | 312/330.1 |
| 2018/0213928 | A1 * | 8/2018 | Kassanoff | A47B 7/00 |
| 2020/0245785 | A1 * | 8/2020 | Smithson | H05K 1/118 |
| 2021/0068531 | A1 * | 3/2021 | Tao | A47B 13/003 |

\* cited by examiner

ADJUSTABLE HEIGHT DESK

CROSS-REFERENCE TO RELATED APPLICATIONS

This application claims the benefit of U.S. Provisional Patent Application No. 63/022,141, entitled "Adjustable Height Desk," which was filed on May 8, 2020, the entirety of which is expressly incorporated herein by reference.

BACKGROUND

Desks providing functionality for moving their working surfaces between different heights (which might be referred to herein as "adjustable height desks") come in a variety of form factors. For example, some adjustable height desks utilize an electric motor to move the working surface, while other adjustable height desks require manual adjustment of the height of the working surface.

One shared attribute between the various types of adjustable height desks is that they can be very difficult for users to assemble and disassemble. It is with respect to these and other considerations that the disclosure made herein is presented.

SUMMARY

An adjustable height desk is disclosed herein that is configured for easy assembly and disassembly. The disclosed desk includes a support core for supporting a working surface. The working surface can be utilized to support a monitor, a laptop computer, and/or other types of items. The working surface can be manually moved to desired heights on the support core. For instance, the working surface might be moved to a position on the support core suitable for a user to work while standing, to a position suitable for a user to work while sitting, or to a position suitable for a user to work while in a squatting position. Various mechanisms can be used to enable the height of the working surface to be adjusted.

In one configuration, the support core includes four planar panels. In this configuration, the edges of the panels are joined to define a substantially hollow support core. Other numbers of panels can be utilized to define the support core in other configurations.

The desk also includes a planar base that is easily attached to and removed from the support core. In order to enable quick and easy assembly and disassembly of the disclosed desk, the support core includes a first panel and a second panel in some configurations. The panels can be made from medium-density fiberboard, solid wood, or another material.

The first and second panels are configured with a first protrusion and a second protrusion at a distal end. The protrusions each include a locking hole. As will be discussed in greater detail below, a locking pin can be inserted through the locking hole to provide a compression fit that secures the panels to the base.

In order to enable attachment of the base to the panels, the base includes a first through hole for receiving the first protrusion of the first panel, a second through hole for receiving the second protrusion of the first panel, a third through hole for receiving the first protrusion of the second panel, and a fourth through hole for receiving the second protrusion of the second panel. When the protrusions of the first and second panels are placed through the corresponding through holes in the base, locking pins can be placed through the locking holes to create a compression fit thereby attaching the first and second panels to the base.

In an assembled form, a first locking pin protrudes through the first locking hole of the first protrusion of the first panel, whereby a compression fit is formed between a bottom of the first locking hole of the first protrusion of the first panel, the first locking pin, and the bottom surface of the base. A second locking pin protrudes through the first locking hole of the first protrusion of the second panel, whereby a compression fit is formed between a bottom of the first locking hole of the first protrusion of the second panel, the second locking pin, and the bottom surface of the base.

The base also includes a first slotted recess that intersects the fourth through hole to form a first common region and a second slotted recess that intersects the second through hole to form a second common region. In its assembled configuration, a third locking pin is located in the second slotted recess which protrudes through the second locking hole of the second protrusion of the first panel, whereby a compression fit is formed between a bottom of the second locking hole of the second protrusion of the first panel, the third locking pin, and an inner surface of the second slotted recess. Similarly, a fourth locking pin is located in the first slotted recess that protrudes through the second locking hole of the second protrusion of the second panel, whereby a compression fit is formed between a bottom of the second locking hole of the second protrusion of the second panel, the fourth locking pin, and an inner surface of the first slotted recess.

In some configurations, the base includes apertures for mounting four wheels, such as casters. In these configurations, one of the casters can be configured with a rotational sweep that encompasses at least a portion of the first slotted recess. A second of the four casters can be configured with a rotational sweep that encompasses at least a portion of the second slotted recess.

In some configurations, the locking pins are configured to enable easy insertion and removal from the locking holes. For example, the locking pins can be configured with a first end and a second end. The first end can be sized for movement through a locking hole and for creating a compression fit when inserted into a locking hole. The second end of the locking pins can be configured with a hook portion for mating with a lever arm profile of a locking pin insertion/removal tool. Through this configuration, the locking pin insertion/removal tool can be utilized to manually remove the locking pins.

In some configurations, the bottom surface of the base includes a recessed portion for removably mounting the locking pin insertion/removal tool. For example, a magnet might be mounted in the recessed portion for attachment to another magnet or metal disk on the locking pin insertion/removal tool. The locking pin insertion/removal tool can be removably mounted within the recessed portion using other mechanisms in other configurations.

The locking pin insertion/removal tool comprises a first end and a second end. The first end can be flat or blunt. A mallet or other implement can be utilized to strike the first end of a locking pin to secure the locking pin in a locking hole. The second end of the locking pin insertion/removal tool can be configured with a hook portion in a lever arm profile for mating with the second end of a locking pin to remove the locking pin.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order that the disclosed technologies may be understood in detail, a more particular description of the disclosed technologies is made by reference to specific embodiments thereof which are illustrated in the appended drawings and described in the following detailed description. In the drawings.

DETAILED DESCRIPTION

The following detailed description is directed to an adjustable height desk configured for easy assembly and disassembly. While the subject matter described herein is presented in the general context of an illustrative adjustable height desk, those skilled in the art will also appreciate that the subject matter described herein can be practiced with other types of adjustable desks having other configurations.

In the following detailed description, references are made to the accompanying drawings that form a part hereof, and which are shown by way of illustration specific configurations or examples. Referring now to the drawings, in which like numerals represent like elements throughout the several FIGS., aspects of an adjustable height desk configured for easy assembly and disassembly will be described.

Figure 1:
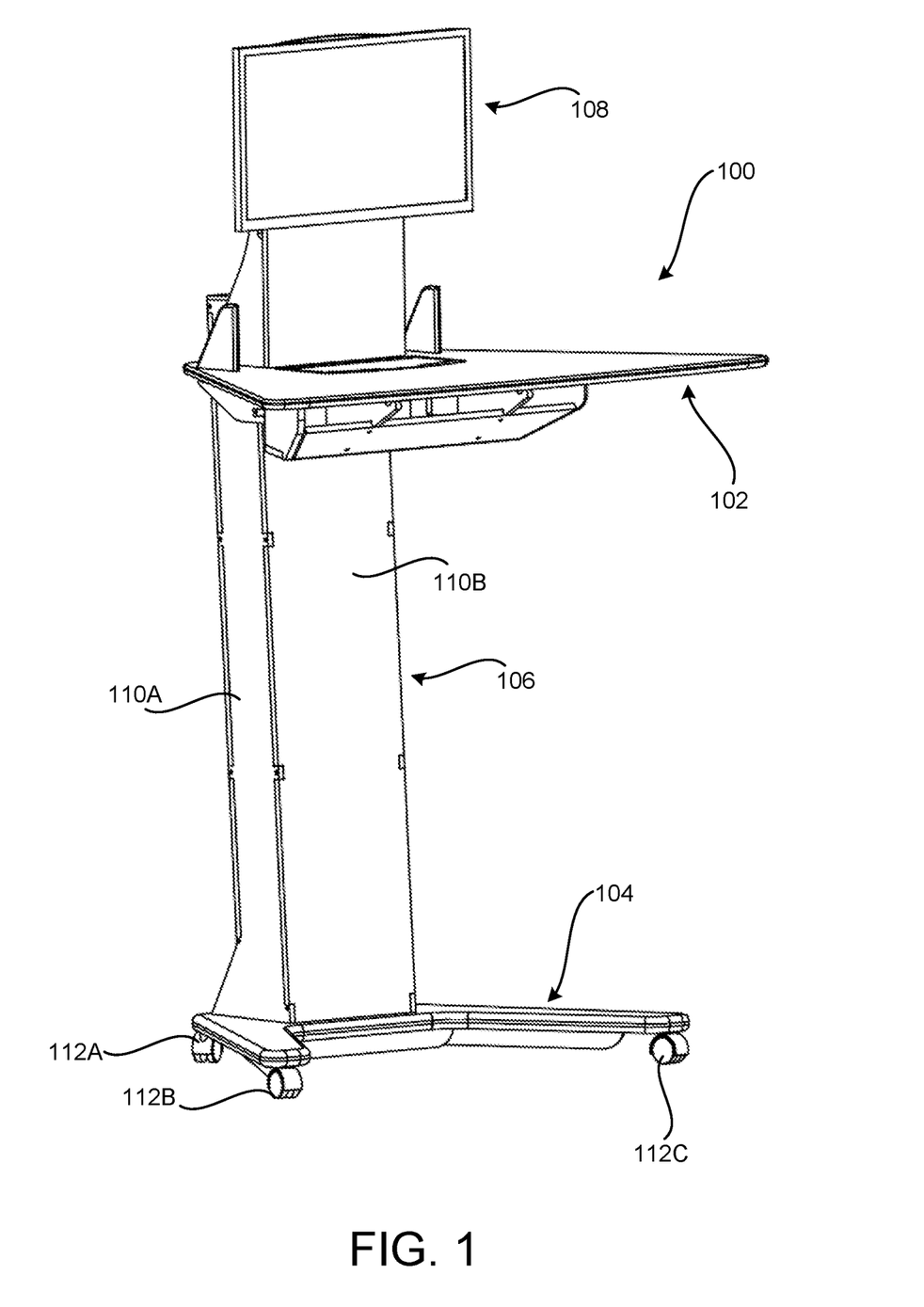
FIG. 1 is a pictorial diagram showing an overview of one embodiment of an adjustable height desk disclosed herein in one configuration.

FIG. 1 is a pictorial diagram showing an overview of one embodiment of an adjustable height desk 100 (which might be referred to herein as "the desk 100") disclosed herein in one configuration. As shown in FIG. 1, the desk 100 includes a support core 106 for supporting a working surface 102. The working surface 102 can be utilized to support a monitor 108, a laptop computer, and/or other types of items.

The working surface 102 can be manually moved to desired heights on the support core 106. For instance, the working surface 102 might be moved to a position on the support core 106 suitable for a user to work while standing, to a position suitable for a user to work while sitting, or to a position suitable for a user to work while in a squatting or floor sitting posture. FIG. 1 shows the desk 100 in a configuration suitable for working while standing. Various mechanisms can be used to enable the height of the working surface 102 to be adjusted.

In one configuration, the support core 106 includes four panels 110 (only panels 110A and 110B are visible in FIG. 1). In this configuration, the edges of the panels 110 are joined to define a substantially hollow support core 106. Other numbers of panels 110 can be utilized to define the support core 106 in other configurations.

The desk 100 also includes a planar base 104 that is easily attached to and removed from the support core 106. In order to enable quick and easy assembly and disassembly of the disclosed desk 100, the support core 106 includes a first panel 110A and a second panel 110C (not shown in FIG. 1) in some configurations. In some configurations, the base includes apertures for mounting four casters 112A-112D (the caster 112D is not visible in FIG. 1).

Figure 2:
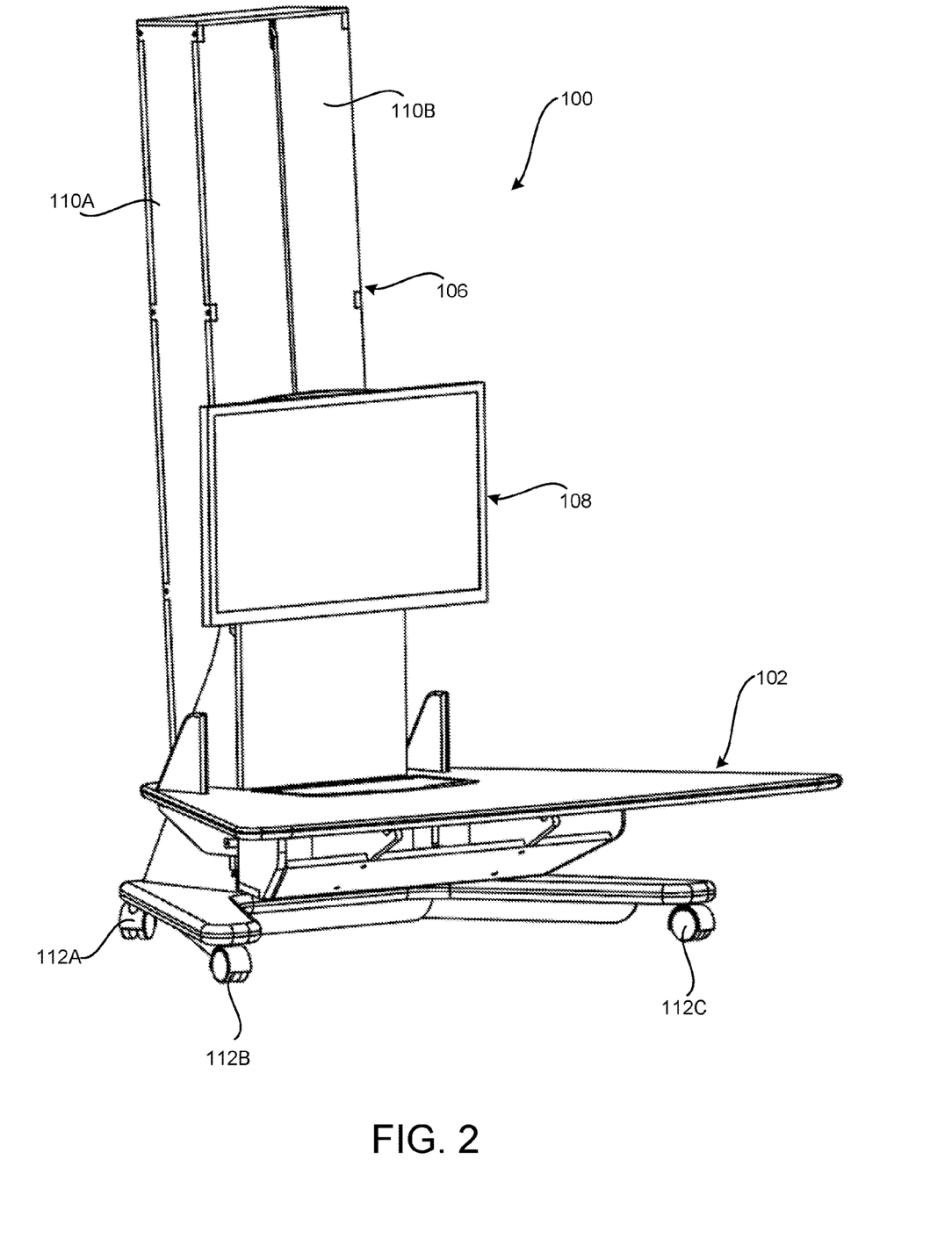
FIG. 2 is a pictorial diagram showing an overview of one embodiment of the adjustable height desk disclosed herein in another configuration.

FIG. 2 is a pictorial diagram showing the adjustable height desk 100 shown in FIG. 1 in another configuration. In the configuration shown in FIG. 2, the working surface 102 has been placed in a position suitable for working while kneeling or sitting on the floor. As discussed above, the working surface 102 can be placed in other positions, such as positions suitable for working while standing, sitting, or kneeling.

Figure 3:
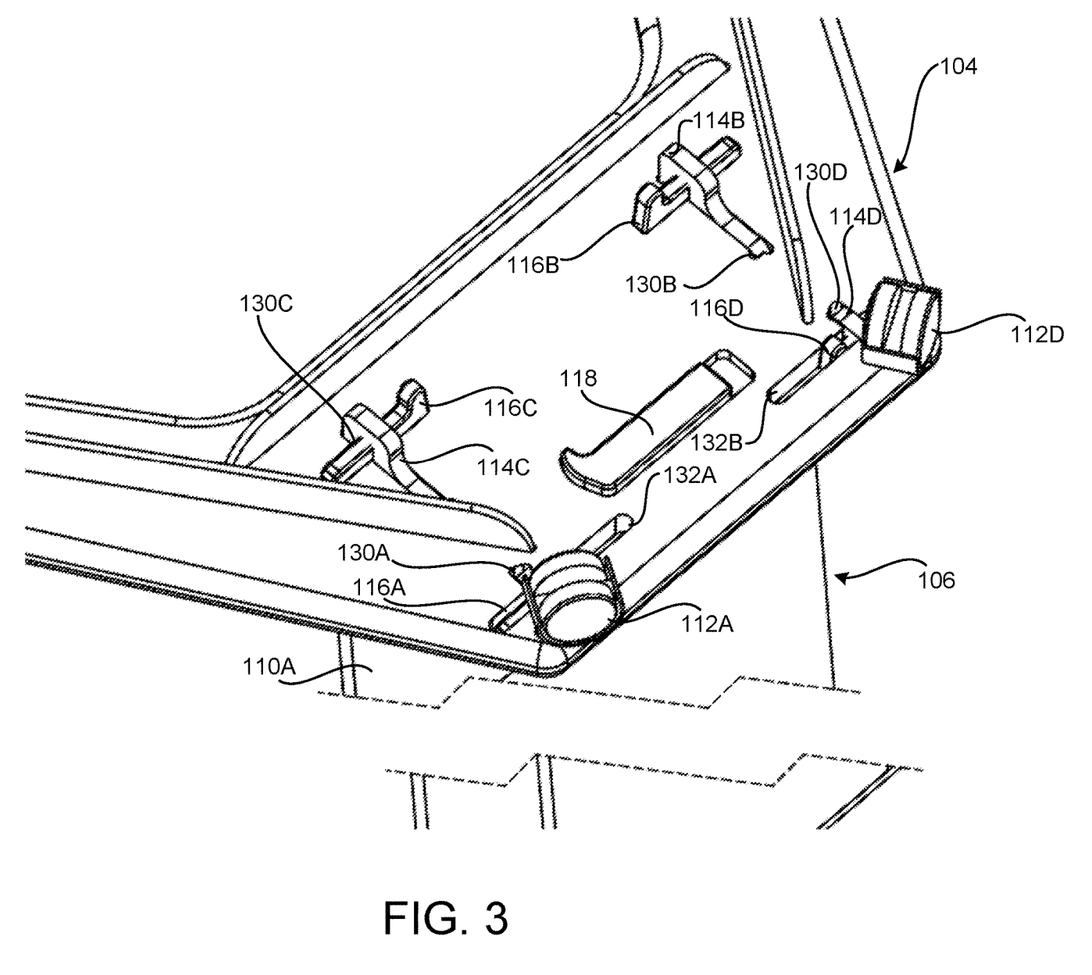
FIGS. 3-11 are schematic diagrams showing aspects of the configuration of a bottom portion of a base of the adjustable height desk shown in FIGS. 1 and 2.
Figure 4:
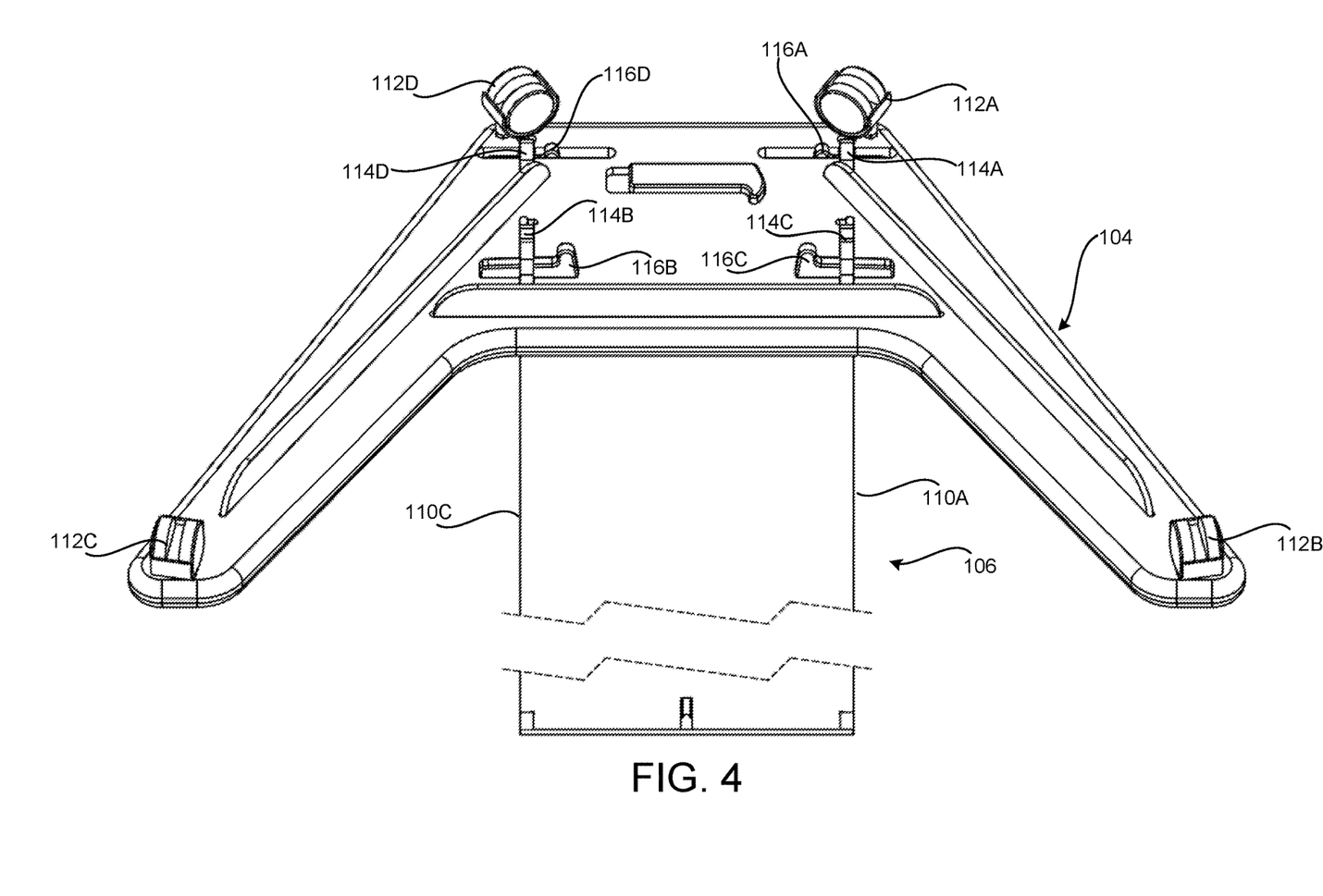
Figure 5:
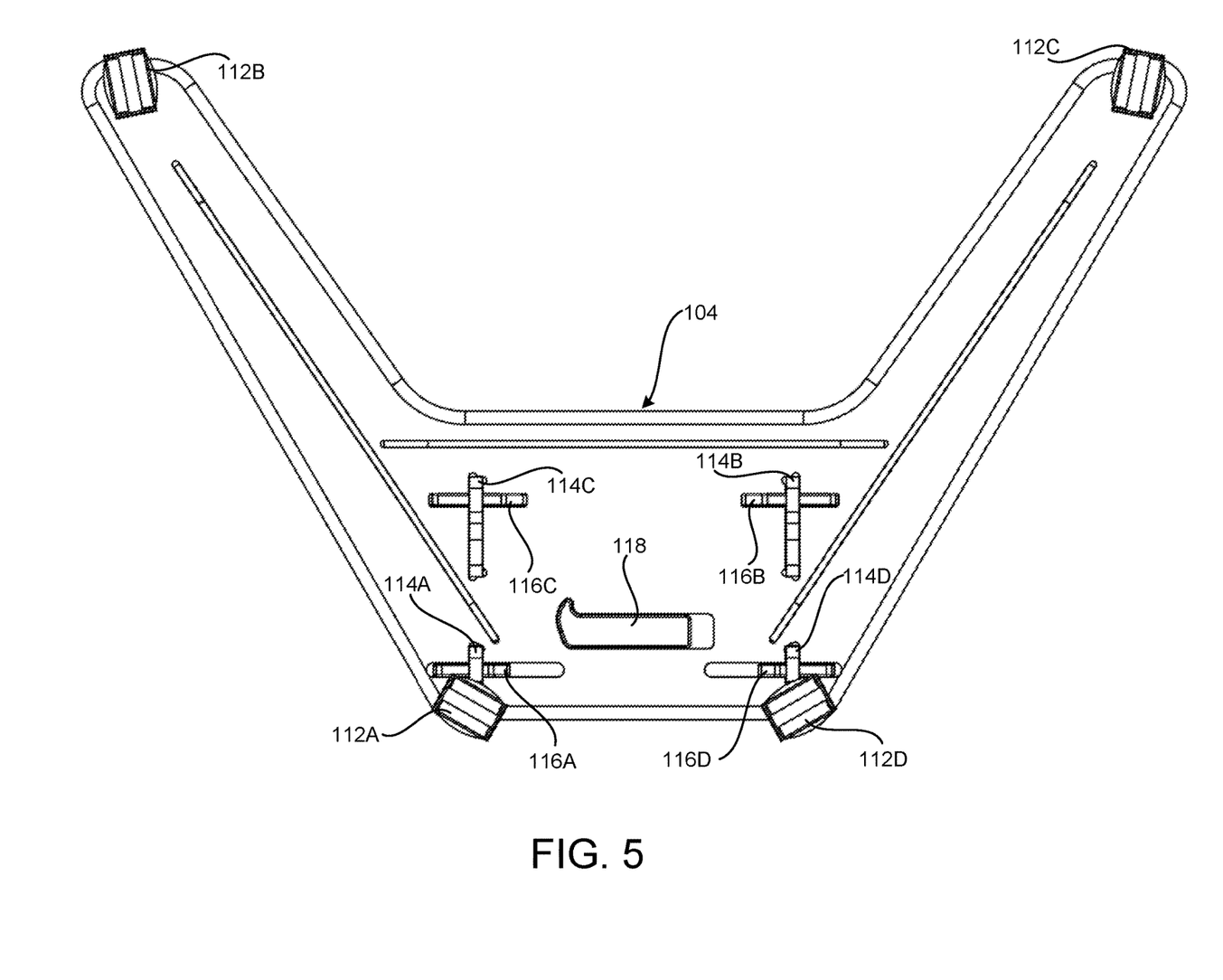
Figure 6:
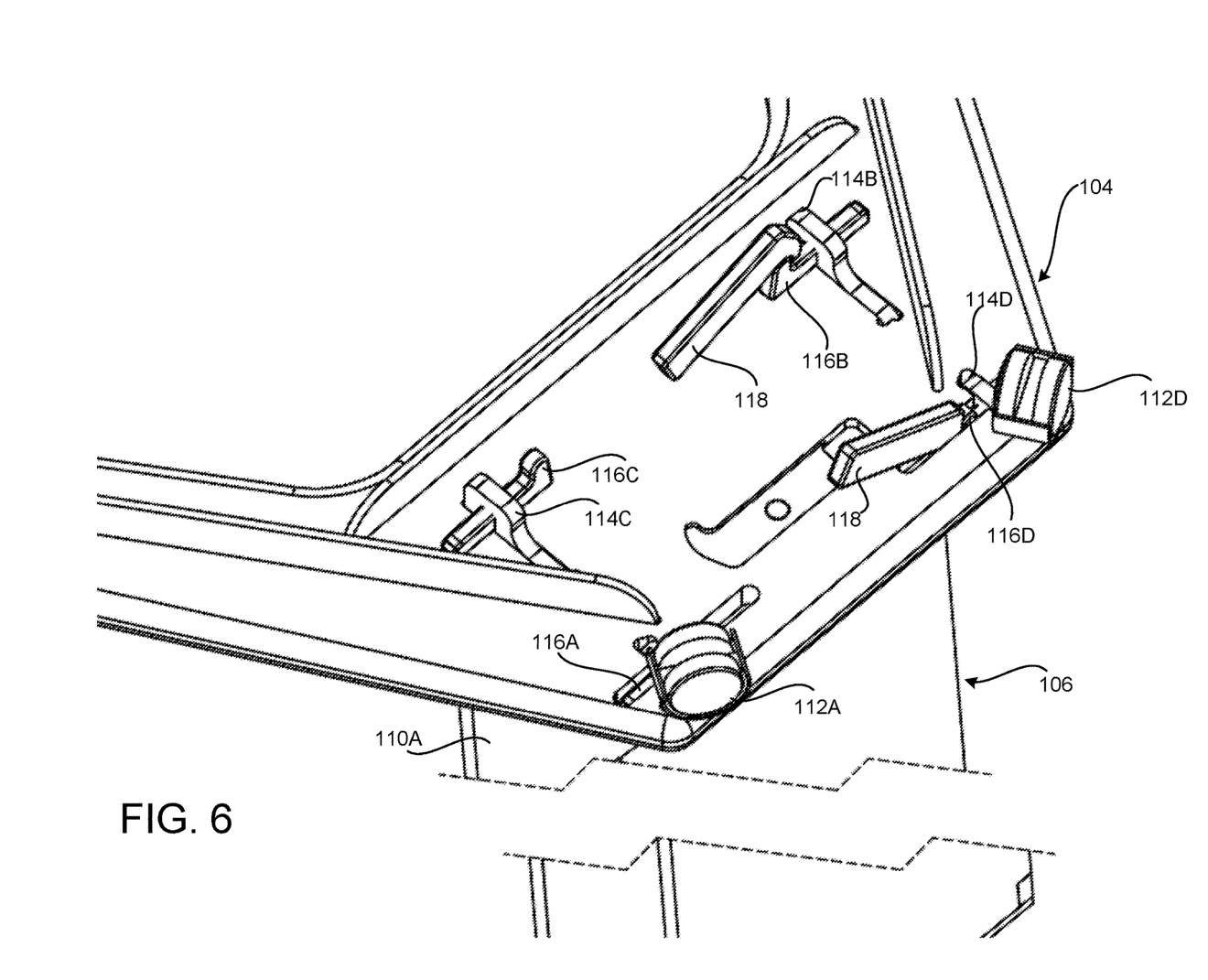

FIGS. 3-11 are schematic diagrams showing aspects of the configuration of a bottom portion of a base 104 of the adjustable height desk 100 shown in FIGS. 1 and 2. In particular, FIG. 3 shows aspects of a configuration of the desk 100 that enables easy connection of the base 104 to the core 106.

As discussed above, the core 106 is formed from interconnected panels 110. The panels 110 can be made from medium-density fiberboard, solid wood, or another suitable material. In one configuration, the first and second panels 110A and 110C are configured with protrusions 114 at a distal end. The first panel 110A includes a protrusion 114C and a protrusion 114A (not visible in FIG. 3). The second panel 110C includes a protrusion 114B and a protrusion 114D.

The protrusions 114 each include a locking hole. As will be discussed in greater detail below, a locking pin 116 can be inserted through the locking hole to provide a compression fit that secures the panels 110 to the base 104. For instance, in the example shown in FIG. 3, a locking pin 116C has been inserted through the locking hole of the protrusion 114C and a locking pin 116D has been inserted through the locking hole of the protrusion 114D. Similarly, a locking pin 116B has been inserted through the locking hole of the protrusion 114B and the locking pin 116A has been inserted through the locking hole of the protrusion 114A (not visible in FIG. 3).

In order to enable attachment of the base 104 to the panels 110, the base 104 includes a first through hole 130C for receiving the first protrusion 114C of the first panel 110A, a second through hole 130A for receiving the second protrusion 114A of the first panel 110A, a third through hole 130B for receiving the first protrusion 114B of the second panel 110C, and a fourth through hole 130D for receiving the second protrusion 114D of the second panel 110C.

When the protrusions 114 of the first and second panels 110 are placed through the corresponding through holes 130 in the base 104, locking pins 116 can be placed through the locking holes to create a compression fit, thereby removably attaching the first and second panels 110 to the base 104.

In an assembled form, a first locking pin 116C protrudes through the first locking hole of the first protrusion 114C of the first panel 110A, whereby a compression fit is formed between a bottom of the first locking hole of the first protrusion 114C of the first panel 110A, the first locking pin 116C, and the bottom surface of the base 104. A second locking pin 116B protrudes through the first locking hole of the first protrusion 114B of the second panel 110C, whereby a compression fit is formed between a bottom of the first locking hole of the first protrusion 114B of the second panel 110C, the second locking pin 116B, and the bottom surface of the base 104.

The base 104 also includes a first slotted recess 132A that intersects the fourth through hole 130A to form a first common region and a second slotted recess 132B that intersects the second through hole 130D to form a second common region. In the assembled form, a third locking pin 116D is placed in the second slotted recess 132B, which protrudes through the second locking hole of the second protrusion 114D of the second panel 110C, whereby a compression fit is formed between a bottom of the second locking hole of the second protrusion 114D of the second panel 110C, the third locking pin 116D, and an inner surface of the second slotted recess 132B.

Similarly, a fourth locking pin 116A is located in the first slotted recess 132A that protrudes through the second locking hole of the second protrusion 114A of the first panel 110A, whereby a compression fit is formed between a bottom of the second locking hole of the second protrusion 114A of the first panel 110A, the fourth locking pin 116A, and an inner surface of the first slotted recess 132A. Additional details regarding these aspects are shown in FIGS. 4-11.

Figure 7:
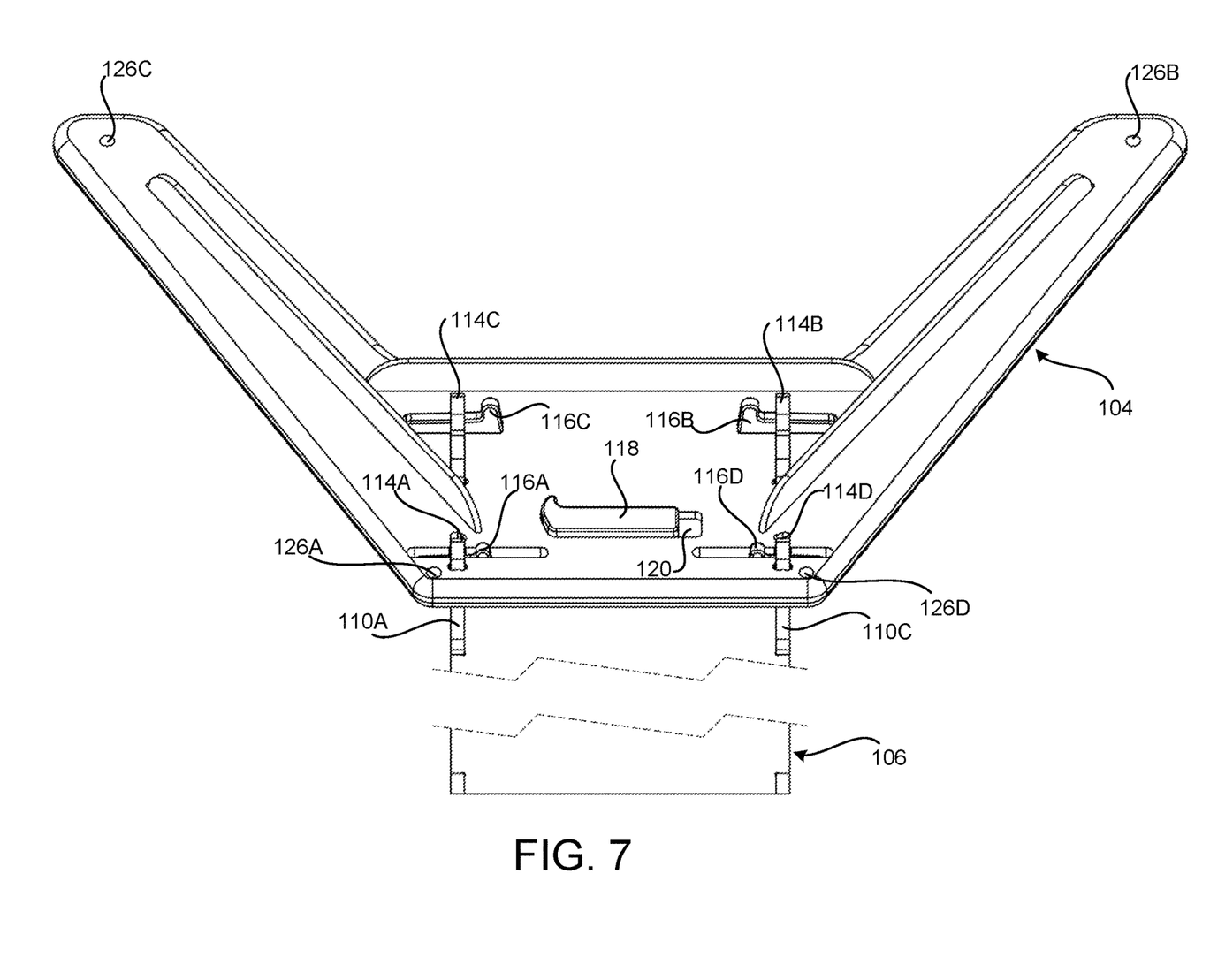
Figure 8:
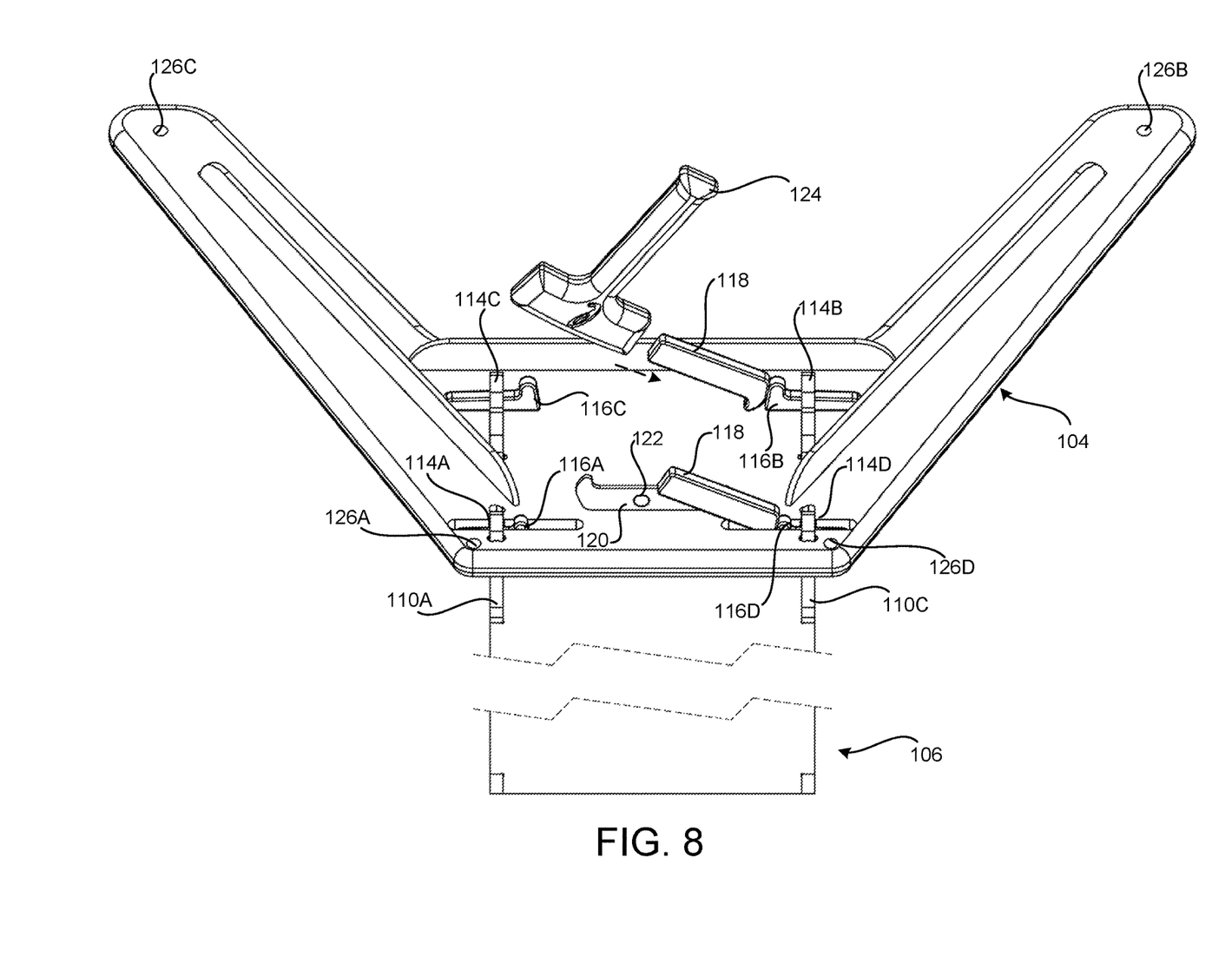
Figure 9:
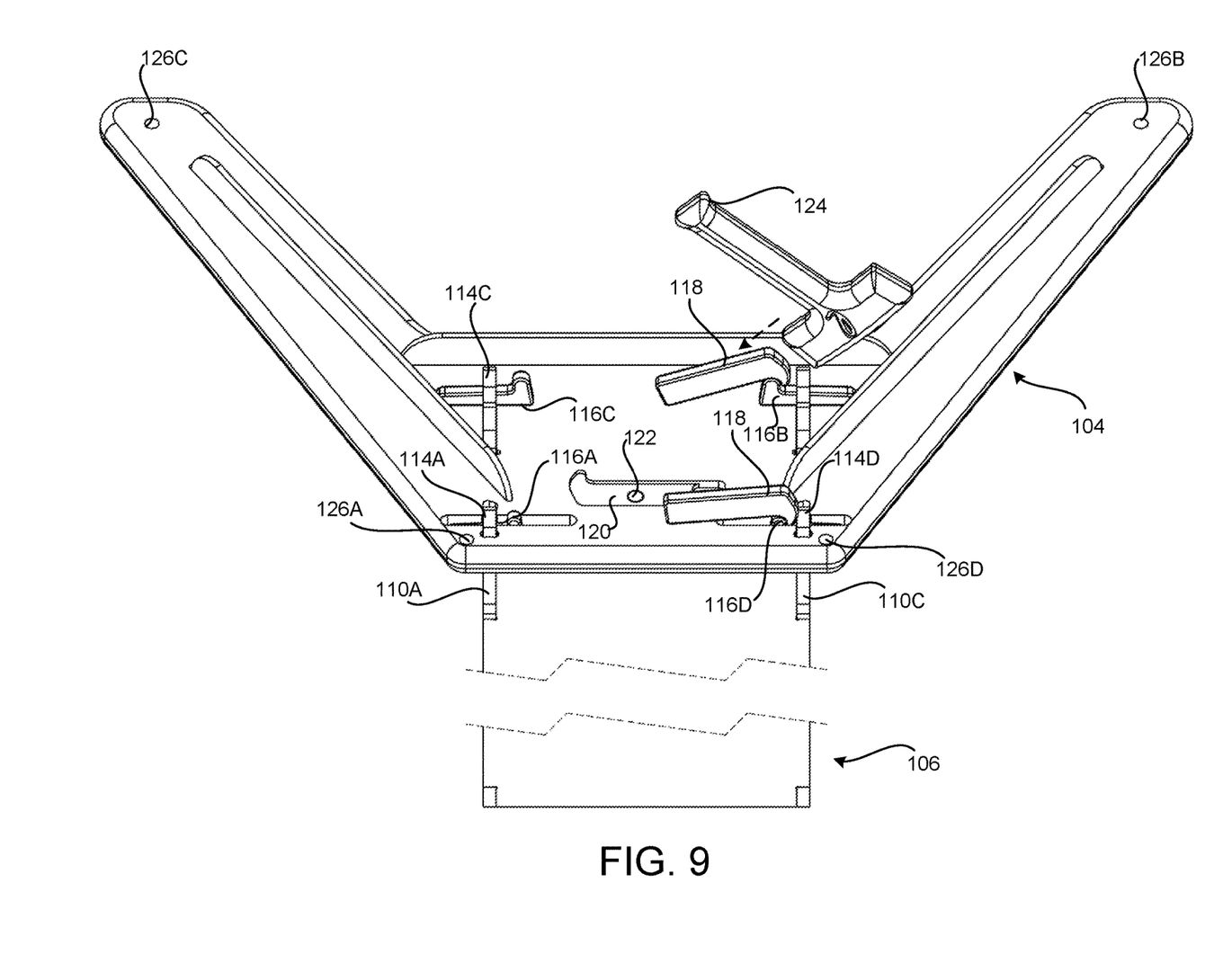
Figure 10:
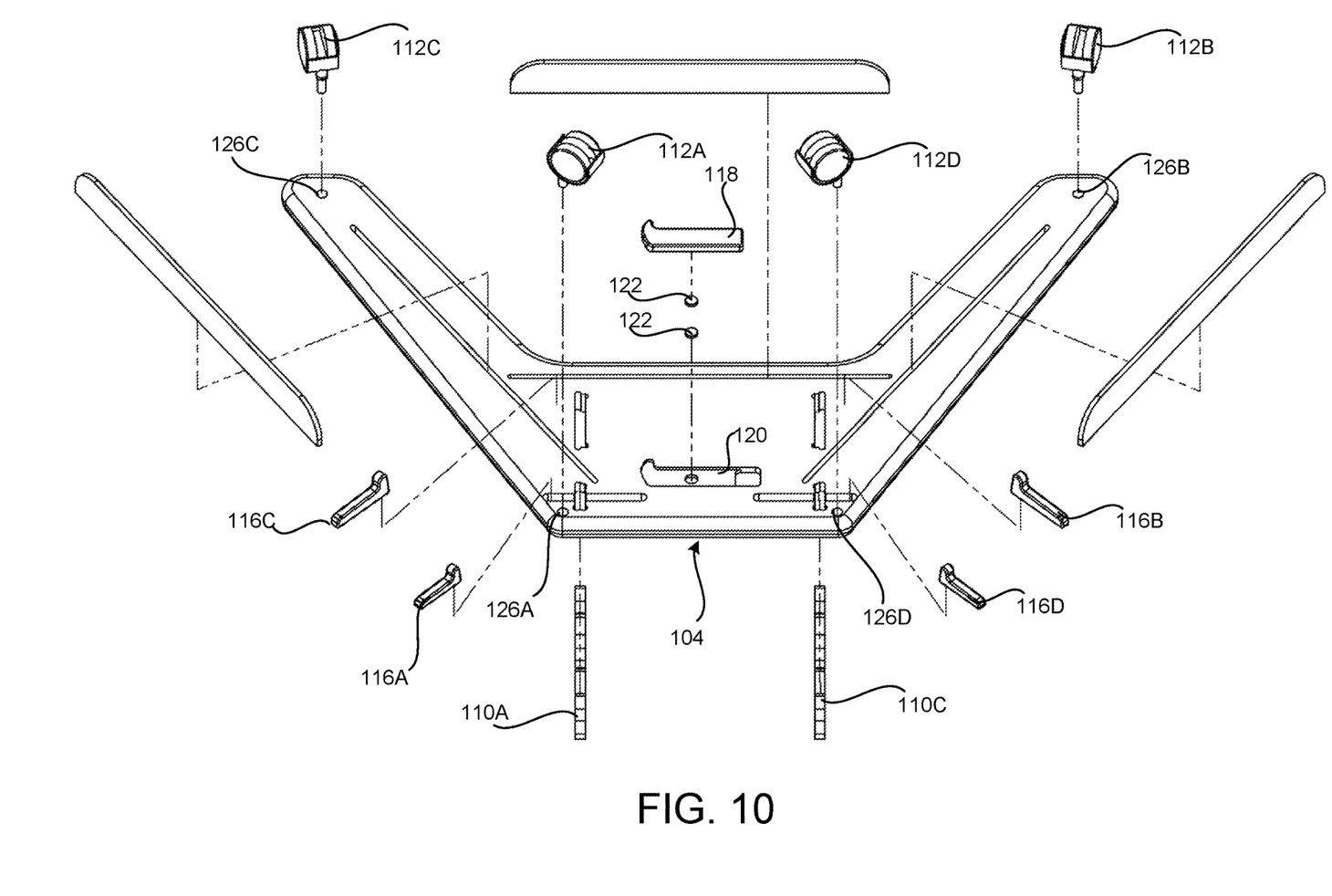
Figure 11:
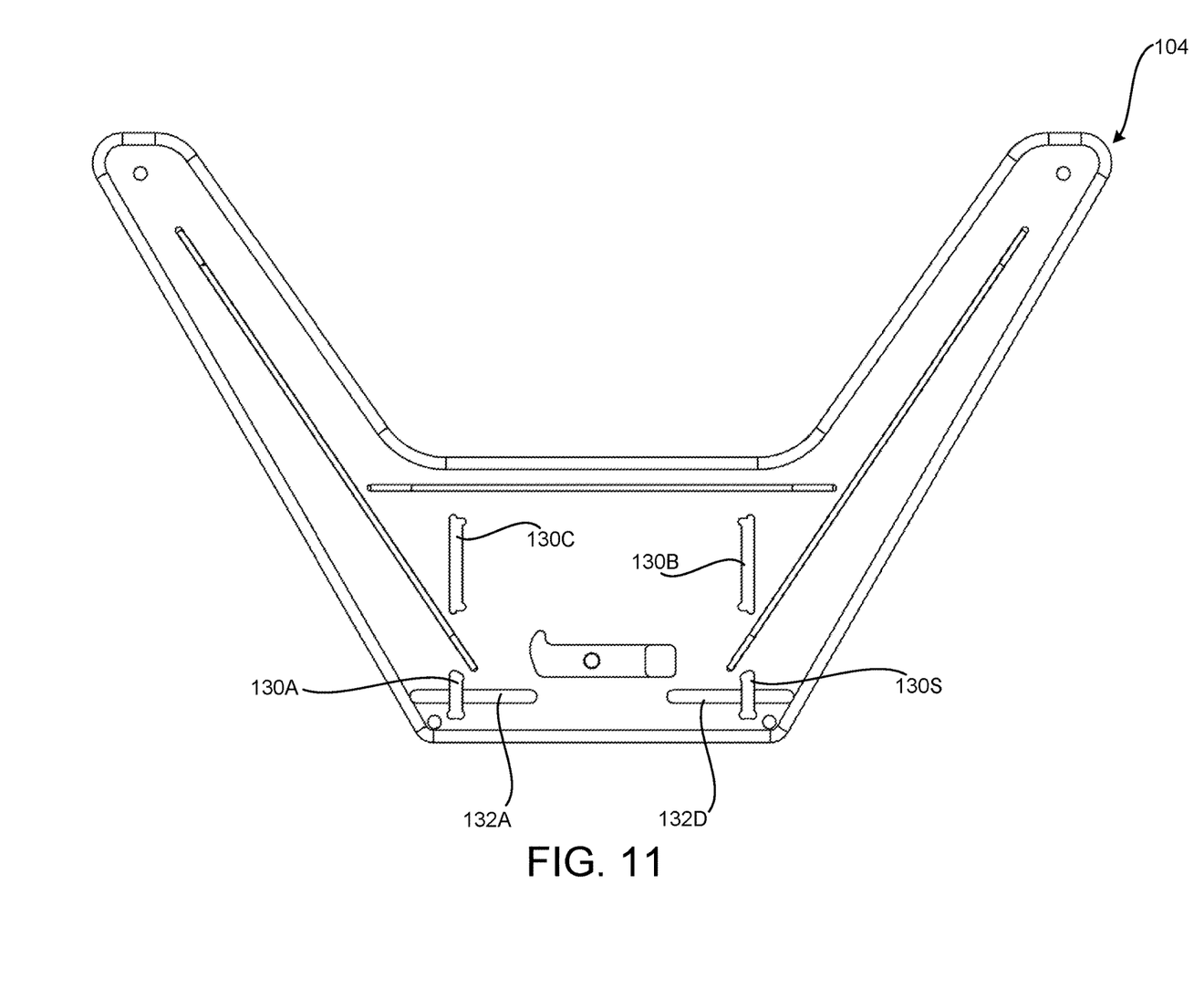

As shown in FIG. 7, in some configurations, the base 104 includes apertures 126A-126C for mounting four casters 112A-112D, respectively. In these configurations, one of the casters 112A can be placed in a location on the base 104 such that it has a rotational sweep that encompasses at least a portion of the first slotted recess. 132A A second of the four casters 112D can be placed in a location on the base 104 such that it has a rotational sweep that encompasses at least a portion of the second slotted recess 132B.

In some configurations, the locking pins 116 are configured to enable easy insertion and removal from the locking holes. For example, the locking pins 116 can be configured with a first end and a second end and might be tapered. The first end of the locking pins 116 can be sized for movement through a locking hole and for creating a compression fit when inserted into a locking hole.

The second end of the locking pins 116 can be configured with a hook portion for mating with a lever arm profile of a locking pin insertion/removal tool 118. Through this configuration, the locking pin insertion/removal tool 118 can be utilized to manually remove the locking pins 116 in the manner shown in FIG. 6 (i.e. by engaging the hook portion of the tool 118 and the hook portion of a locking pin 116 and applying rotational pressure to the tool 118) and FIG. 9 (i.e. by engaging the hook portion of the tool 118 and the hook portion of a locking pin 116 and tapping on the end of the locking pin 116 having the hook portion with a mallet 124 or other implement).

As shown in FIG. 7, in some configurations, the bottom surface of the base 104 includes a recessed portion 120 for removably mounting the locking pin insertion/removal tool 118. For example, a magnet 122 might be mounted in the recessed portion 120 for attachment to another magnet 122 or metal disk on the locking pin insertion/removal tool 118. The recessed portion 120 has a profile substantially similar to the profile of the tool 118 in one configuration. The locking pin insertion/removal tool 118 can be removably mounted within the recessed portion 120 using other mechanisms in other configurations.

In one configuration, the locking pin insertion/removal tool 118 comprises a first end and a second end. The first end can be flat or blunt. A mallet 124 or other implement can be utilized to strike the first end of the tool 118 to insert a locking pin 116 into a locking hole in the manner shown in FIG. 8. As mentioned above, the second end of the locking pin insertion/removal tool 118 can be configured with a hook portion in a lever arm profile for mating with the second end of a locking pin 116 to remove the locking pin 116 in the manner shown in FIGS. 6 and 9.

Based on the foregoing, it should be appreciated that an adjustable height desk configured for easy assembly and disassembly has been disclosed herein. It is also to be appreciated that the subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims. The invention may be embodied in other specific and unmentioned forms, apparent to the skilled artisan, without departing from the spirit or essential attributes thereof, and it is therefore asserted that the foregoing embodiments are in all respects illustrative and not to be construed as limiting.

References to relative terms such as upper and lower, front and back, top and bottom, left and right, or the like, are intended for convenience of description and are not contemplated to limit the disclosure presented herein, or its components, to any specific orientation. All dimensions depicted in the figures may vary with a potential design and the intended use of a specific embodiment of the disclosed invention without departing from the scope thereof.

Each of the additional features and methods disclosed herein may be used separately, or in conjunction with other features and methods, to provide the disclosed functionality or additional functionality and methods for making and using the same. Therefore, combinations of features and methods disclosed herein may not be necessary to practice the invention in its broadest sense and are instead disclosed merely to particularly describe representative and preferred embodiments of the instant invention.

What is claimed is:

1. A desk, comprising:
   a support core comprising a first panel and a second panel,
      the first panel having a first protrusion with a first locking hole and a second protrusion with a second locking hole, and
      the second panel having a first protrusion with a first locking hole and a second protrusion with a second locking hole;
   a base comprising a bottom surface, the bottom surface comprising
      a first through hole for receiving the first protrusion of the first panel,
      a second through hole for receiving the second protrusion of the first panel,
      a third through hole for receiving the first protrusion of the second panel,
      a fourth through hole for receiving the second protrusion of the second panel,
      a first slotted recess intersecting the fourth through hole, and
      a second slotted recess intersecting the second through hole;
   a first locking pin protruding through the first locking hole of the first protrusion of the first panel, whereby a compression fit is formed between a bottom of the first locking hole of the first protrusion of the first panel, the first locking pin, and the bottom surface of the base;
   a second locking pin protruding through the first locking hole of the first protrusion of the second panel, whereby a compression fit is formed between a bottom of the first locking hole of the first protrusion of the second panel, the second locking pin, and the bottom surface of the base;

a third locking pin in the second slotted recess, the third locking pin protruding through the second locking hole of the second protrusion of the first panel, whereby a compression fit is formed between a bottom of the second locking hole of the second protrusion of the first panel, the third locking pin, and an inner surface of the second slotted recess; and a fourth locking pin in the first slotted recess, the fourth locking pin protruding through the second locking hole of the second protrusion of the second panel, whereby a compression fit is formed between a bottom of the second locking hole of the second protrusion of the second panel, the fourth locking pin, and an inner surface of the first slotted recess.

2. The desk of claim 1, further comprising four casters, wherein a first of the four casters has a rotational sweep that encompasses at least a portion of the first slotted recess, and wherein a second of the four casters has a rotational sweep that encompasses at least a portion of the second slotted recess.

3. The desk of claim 1, wherein the locking pins have a first end and a second end, wherein the first end is sized for movement through a locking hole, and wherein the second end has a hook portion for mating with a lever arm profile of a locking pin insertion/removal tool.

4. The desk of claim 3, further comprising the locking pin insertion/removal tool, wherein the locking pin insertion/removal tool comprises a first end and a second end, wherein the first end is blunt, wherein the second end has a hook portion for mating with the second end of a locking pin to remove the locking pin, and wherein the bottom surface of the base comprises a recessed portion for removably mounting the locking pin insertion/removal tool.

* * * * *